United States Patent
Fuchs et al.

(10) Patent No.: US 8,874,362 B2
(45) Date of Patent: Oct. 28, 2014

(54) METHOD AND DEVICE FOR DETERMINING THE LOCATION OF A VEHICLE

(75) Inventors: Alois Fuchs, Karlsbad (DE); Frank Binder, Karlsruhe (DE)

(73) Assignee: INIT Innovative Informatikanwendungen in Transport-, Verkehrs—und Leitsystemen GmbH, Karlsruhe (DE)

(*) Notice: Subject to any disclaimer, the term of this patent is extended or adjusted under 35 U.S.C. 154(b) by 348 days.

(21) Appl. No.: 13/060,377

(22) PCT Filed: Jun. 8, 2009

(86) PCT No.: PCT/DE2009/000805
§ 371 (c)(1),
(2), (4) Date: Mar. 21, 2011

(87) PCT Pub. No.: WO2010/022693
PCT Pub. Date: Mar. 4, 2010

(65) Prior Publication Data
US 2011/0172915 A1  Jul. 14, 2011

(30) Foreign Application Priority Data

Aug. 26, 2008 (DE) .......... 10 2008 039 686
Oct. 22, 2008 (DE) .......... 10 2008 052 642

(51) Int. Cl.
*G01C 21/30* (2006.01)
*G01C 21/28* (2006.01)
*G01S 19/45* (2010.01)
G08G 1/0968 (2006.01)
G01C 21/36 (2006.01)
G01C 21/26 (2006.01)
G01C 21/00 (2006.01)

(52) U.S. Cl.
CPC .......... *G01C 21/28* (2013.01); *G08G 1/096827* (2013.01); *G01C 21/3611* (2013.01); *G01C 21/26* (2013.01); *G01C 21/36* (2013.01); *G01C 21/00* (2013.01); *G01S 19/45* (2013.01)
USPC ............ 701/400; 701/408; 701/410; 701/412

(58) Field of Classification Search
CPC ........ G01C 21/26; G01C 21/36; G01C 21/00; G01C 21/3611; G08G 1/096827
USPC ........... 701/446, 472, 445, 408, 23, 469, 208, 701/478.5, 448, 495, 410, 400; 342/357.52, 342/357, 457, 357.25, 357.35, 357.3, 358, 342/357.31; 702/189; 340/988, 990, 995.25
See application file for complete search history.

(56) References Cited

U.S. PATENT DOCUMENTS 5,334,986 A    8/1994  Fernhout
5,394,333 A *  2/1995  Kao .............................. 701/445
(Continued)

FOREIGN PATENT DOCUMENTS

WO     WO 00/50917      8/2000
WO     WO 2005/076031   8/2005

OTHER PUBLICATIONS

International Search Report for International Application No. PCT/DE2009/000805.
(Continued)

*Primary Examiner* — Behrang Badii
(74) *Attorney, Agent, or Firm* — Alston & Bird LLP

(57) ABSTRACT

A method for determining the location of a vehicle using a GPS receiver (9) and a predefinable coordinate system, in particular a city map, a map, a nautical chart or the like, comprises the following method steps: determination of the GPS coordinates by means of a GPS receiver or some other suitable method, for example Gallileo, beacon, etc., projection of the determined coordinates onto the coordinate system and correction of the GPS coordinates or the projected coordinates in the sense of compound navigation. A corresponding device is specified.

14 Claims, 1 Drawing Sheet

(56) References Cited

U.S. PATENT DOCUMENTS

| | | | |
|---|---|---|---|
| 5,416,712 A | | 5/1995 | Geier et al. |
| 5,563,786 A | * | 10/1996 | Torii ............................... 701/23 |
| 6,249,246 B1 | | 6/2001 | Bode et al. |
| 6,278,945 B1 | | 8/2001 | Lin |
| 6,401,036 B1 | * | 6/2002 | Geier et al. ................... 701/495 |
| 6,408,245 B1 | | 6/2002 | An et al. |
| 6,502,033 B1 | * | 12/2002 | Phuyal ......................... 701/445 |
| 6,577,952 B2 | * | 6/2003 | Geier et al. ................... 701/446 |
| 6,597,987 B1 | | 7/2003 | Barton |
| 6,931,322 B2 | * | 8/2005 | Jung et al. .................... 701/446 |
| 7,274,504 B2 | | 9/2007 | Crane et al. |
| 7,603,233 B2 | * | 10/2009 | Tashiro ......................... 701/448 |
| 7,987,047 B2 | * | 7/2011 | Ishigami et al. ............ 701/478.5 |
| 2003/0036847 A1 | * | 2/2003 | Geier et al. .................... 701/209 |
| 2008/0091347 A1 | * | 4/2008 | Tashiro ......................... 701/210 |
| 2011/0071755 A1 | * | 3/2011 | Ishigami et al. .............. 701/208 |

OTHER PUBLICATIONS

Written Opinion for International Application No. PCT/DE2009/000805 (undated).

* cited by examiner

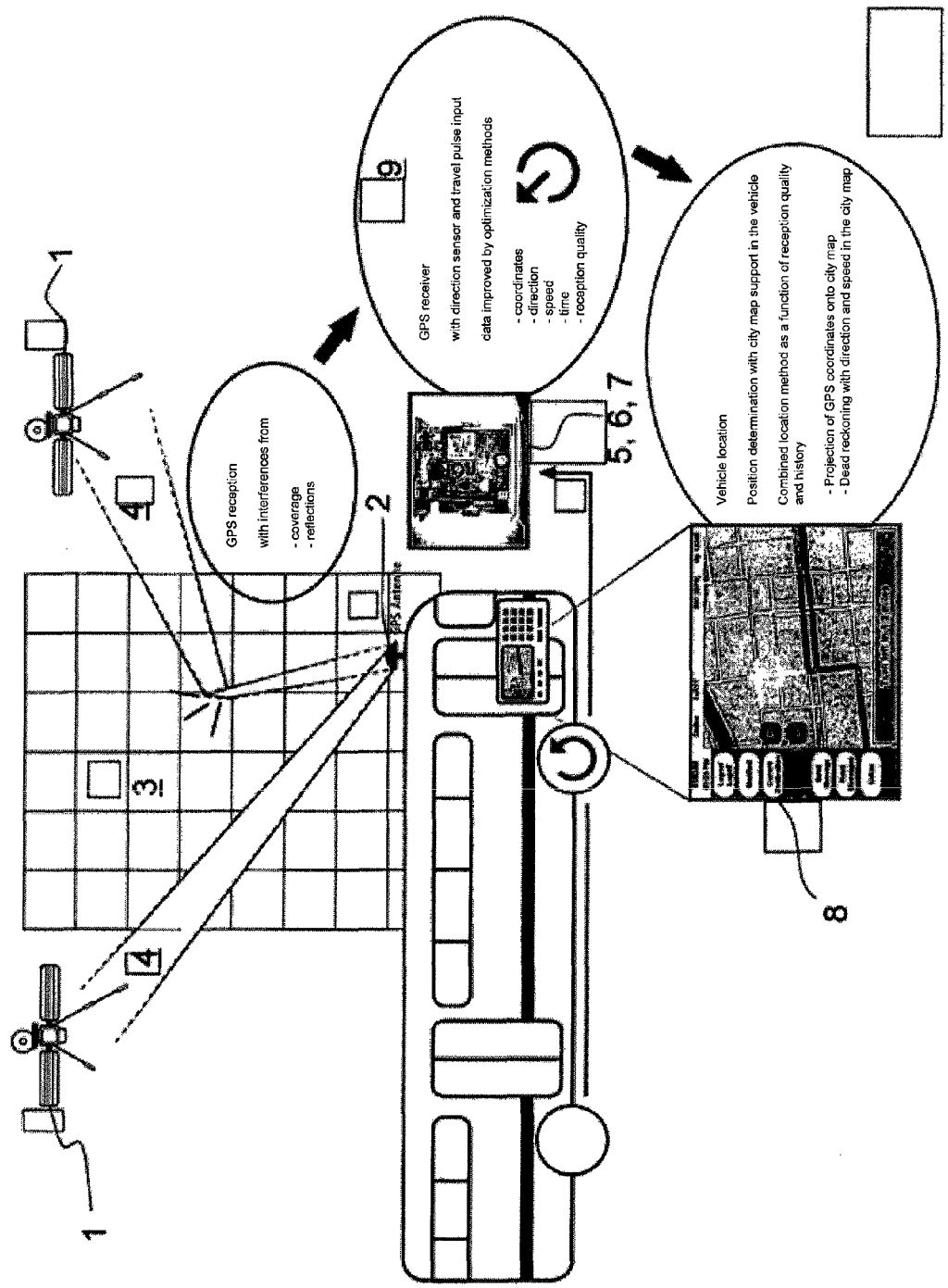

METHOD AND DEVICE FOR DETERMINING THE LOCATION OF A VEHICLE

BACKGROUND OF THE INVENTION

1. Field of the Invention

The invention concerns a method for determining the location of a vehicle using a GPS receiver and a predefinable coordinate system, especially a city map, map, nautical chart or the like. The invention also concerns a corresponding device.

2. Description of Related Art

Methods and devices of the generic type are adequately known from practice in the context of now common vehicle navigation systems. A GPS receiver is used to determine the location of the vehicle and the coordinates obtained via the GPS receiver are projected onto a city map or map or a nautical chart or the like. The exact position of the corresponding vehicle on the map or on the coordinate system so defined can be determined and displayed.

The method known from practice for determining the location of the vehicle, however, is problematical to the extent that it relies on good GPS reception. Especially in large cities with high buildings, for example, in a large city, like New York, the GPS signals are blocked by buildings forming ravines or generally repeatedly reflected on the building facades. This leads to interference in GPS reception and often to incorrect determination of the position of the GPS receiver. Imprecise or incorrect projection into the coordinate system is the result. This applies both with respect to corresponding methods, and also with respect to a corresponding device.

The underlying task of the invention is therefore to configure and modify a method and also a device for determining the location of the vehicle using a GPS receiver or another appropriate system for determination of the location and a predefinable coordinate system, especially a city map, a map, a nautical chart or the like, so that incorrect determination of location due to "poor" GPS signals is largely eliminated.

SUMMARY OF VARIOUS EMBODIMENTS

The preceding task is solved according to the invention by the various method embodiments described herein. The method known from practice for determining the location of the vehicle using a GPS receiver and a predefinable coordinate system, especially a city map, a map, a nautical chart or the like, is characterized by the following method steps:

Determination of the GPS coordinates by means of the GPS receiver or another appropriate method, for example, Galileo, beacon, etc., Projection of the determined coordinates onto the coordinate system and Correction of the GPS coordinates or projected coordinates according to dead reckoning.

It was recognized according to the invention that a map-supported GPS system is not sufficient for error-free determination of the location of the vehicle, at any rate, not if the GPS signals required for determining the location, as always, are distorted or deflected or blocked. It was recognized accordingly that mere projection of the determined coordinates onto the coordinate system, i.e., onto the maps made available by the system, is not sufficient. Instead, in the method according to the invention a correction occurs of the GPS coordinates or the coordinates projected onto the map in the sense of dead reckoning. By means of this correction, the actual location of the vehicle can be determined with great certainty, in which navigation uses GPS data, on the one hand, and predefinable or determinable/detectable correction parameters, on the other.

Specifically, the correction occurs by means of previously determined or projected coordinates and/or by means of data determined by additional sensor technology. In other words, the history of data determined previously in time plays an essential role in the correction, these data being fed together with the current GPS coordinates to an appropriate algorithm. Ultimately, a type of "vector matching" occurs here.

In any case, it is advantageous if the correction of the coordinates in the coordinate system occurs with consideration of previously determined or projected coordinates, namely, by means of the history. It is then assumed that the vehicle continuously travels its path. An unsteady path trend is attributed to incorrect GPS data and is "smoothed" or corrected according to the history.

As already previously mentioned, it is a further advantage if the correction of the coordinates in the coordinate system occurs with consideration of data that are determined by means of additional sensor technology. Thus, it is particularly advantageous if the correction occurs with consideration of a determined direction and/or a direction change of the vehicle. To determine such a direction change, a compass or gyro or the travel path of two opposite wheels is prescribed.

It is also conceivable that the path covered by the vehicle is considered to correct the coordinates in the coordinate system. This is preferably determined by means of an odometer provided precisely for this purpose. Jumps in the path trend can be ideally corrected on this account, namely, by comparison of the actually traveled (determined) path with the path of the projected coordinates on the map.

Correction of the coordinates in the coordinate system can also be carried out with consideration of a determined speed and/or a speed change of the vehicle. The same applies for including or considering the time and/or time trend. Finally, it is conceivable that all the aforementioned data are used to correct the actual position of the vehicle, in which these data can be incorporated with different weighting in the algorithm. A type of vector correction is therefore possible.

In principle, it is conceivable that correction of the coordinates in the coordinate system mostly occurs with consideration of the quality of GPS reception, preferably with consideration of a predefinable minimum number of received satellites. It is thus possible to make the scope of the correction and therefore the expense connected with it dependent on the number of received satellites. It is also conceivable that the correction function is only started when the number of received satellites falls below a stipulated minimum number. A continuous correction, regardless of reception quality, is also possible and can be implemented via an appropriate processor in the vehicle, i.e., "on board," namely, using a computer in the vehicle. For example, a mini-PC can be provided for this purpose.

With further advantage, the determined position of the vehicle is checked by means of a plausibility test, preferably involving the history and data obtained by means of additional sensor technology. It can thus be determined with an appropriate plausibility test whether and to what extent a deviation from the actual position is present or must be present. A corresponding correction is then offered and automatically carried out.

The various device embodiments described herein according to the invention also solve the task mentioned in the introduction. A device for determining the location of the vehicle is also proposed using a GPS receiver and a predefinable coordinate system, especially a city map, a map, a nautical chart or the like. The GPS coordinates can be determined by means of the GPS receiver and are projected into or onto the coordinate system. The GPS coordinates and the projected coordinates can be corrected in the sense of dead reckoning, namely, when the GPS signals are deficient according to the aforementioned comments.

For correction of the coordinates, an odometer and/or a compass or gyro or an odometer for each of the two opposite wheels is advantageously provided. The provision of additional sensor technology is conceivable.

With further advantage, the GPS receiver, odometer and/or gyro are arranged in a box as a functional unit. It is also conceivable that the box includes a mini-PC with an appropriate data memory, via which the map and the coordinate system are made available. The determined and optionally corrected data are also entered in the data memory, in order to establish the history of the determined and optionally corrected data. It is also conceivable that the coordinate system and the map are furnished via a chip, a USB stick or another data carrier for replacement.

It should again be mentioned here that the device includes a processor with an appropriate algorithm, via which the correction or vector matching occurs. GPS data, as well as data of the gyro, odometer, speed and also recorded history, are used for correction.

The method according to the invention also permits precise following of position during longer failure of GPS reception. In principle, layout of the system without a GPS receiver is also possible, which is then supported on recording of path and direction changes. This is sufficient in such a case. The establishment of the coordinates of an initial position required here could occur by manual input or fix devices (direction-finding beacon) at prominent points, for example, operating yard, bus stop, etc.

BRIEF DESCRIPTION OF THE SEVERAL VIEWS OF THE DRAWINGS

There are different possibilities of advantageously configuring and modifying the instructions of the present invention. For this purpose, the various other embodiments described herein are referred to, on the one hand, and the subsequent explanation of a preferred practical example of the invention with reference to the drawing, on the other. In conjunction with explanation of the preferred practical example of the invention by means of the drawing, the generally preferred embodiments and modifications of the instructions are also explained. In the drawing FIG. 1 shows schematically as a block diagram the essential function of the method according to the invention and the device according to the invention.

DETAILED DESCRIPTION

In the depiction in the single FIGURE, two satellites 1 are shown whose signals are received via a GPS antenna 2. The building ravines 3 of a large city are shown schematically, in which there is a hazard that some of the GPS signals 4 are blocked or reflected on the building facades. GPS reception and position data are therefore distorted, namely, by coverage and reflections.

According to the invention, the method is equipped with a correction of GPS coordinates or the projected coordinates in the sense of dead reckoning. The GPS receiver 9 includes according to the invention a farther-reaching sensor technology, for example, a direction sensor 5 or a gyro sensor and a path sensor or odometer 6. The speed determined via the vehicle, the time and the time trend and reception quality could also be considered for correction of the position signals, namely, as parameters in an appropriate algorithm that is processed in a computer 7, for example, in a mini-PC.

The provision of a gyro sensor 5 and odometer 6 is indicated in the single FIGURE. Display of the determined and corrected data, i.e., the correct position in the coordinate system and on the corresponding city map or map, is also indicated via a display 8.

The errors in vehicle location caused by coverage and reflection of GPS signals 4 can be corrected incredibly simply, so that error-free position determination with city map support in the vehicle is possible. This is achieved by a combined location method as a function of reception quality and history, namely, in that the GPS coordinates are projected onto the city map, in which the basis of the method is dead reckoning with consideration of the direction change and speed in the city map.

With respect to additional features that cannot be deduced from the single FIGURE, the general part of the description and the patent claims are referred to, to avoid repetitions.

Finally, it is explicitly pointed out that the practical example just explained merely serves to explain the claimed instructions, but does not restrict them to the practical example.

The invention claimed is:

1. A method for determining the location of a vehicle using a GPS receiver and a predefinable coordinate system, especially a city map, a map, a nautical chart or the like, said method comprising:
   determining GPS coordinates by means of the GPS receiver or another appropriate method, for example, Galileo, beacon, etc.;
   projecting the determined GPS coordinates onto the coordinate system; and
   correcting the projected coordinates by use of dead reckoning with consideration of the direction change and speed of the vehicle in the coordinate system,
      wherein correcting the coordinates in the coordinate system occurs with consideration of previously determined or projected coordinates by means of the history,
      wherein the path of the vehicle with an unsteady path trend is smoothed or corrected according to the history, and
      wherein the correction of the coordinates in the coordinate system occurs with consideration of the quality of the GPS reception in such a way that the scope of the correction and expense involved with the correction is made dependent on the number of received satellites.

2. The method according to claim 1, wherein the correcting occurs by means of previously determined or projected coordinates and/or data determined by additional sensor technology.

3. The method according to claim 1, wherein correcting the coordinates in the coordinate system occurs with consideration of a determined direction and/or direction change of the vehicle.

4. The method according to claim 3, wherein a compass or gyro is used to determine the direction change.

5. The method according to claim 1, wherein correcting the coordinates in the coordinate system occurs with consideration of the path covered by the vehicle, preferably by means of odometer.

6. The method according to claim 1, wherein correcting the coordinates in the coordinate system occurs with consideration of a speed and/or speed change of the vehicle.

7. The method according to claim 1, wherein correcting the coordinates in the coordinate system occurs with consideration of the time and/or time trend.

8. The method according to claim 1, wherein the determined position of the vehicle is checked by means of a plausibility test, preferably involving the history and optionally by means of data obtained from additional sensor technology.

9. A device for determining the location of a vehicle using a GPS receiver and a predefinable coordinate system, especially a city map, map, nautical chart or the like, said device configured such that GPS coordinates are determined by means of GPS receiver and projected onto the coordinate system, and the projected coordinates are corrected by use of dead reckoning with consideration of the direction change and speed of the vehicle in the coordinate system, wherein correction of the coordinates in the coordinate system occurs with consideration of previously determined or projected coordinates by means of the history, wherein the path of the vehicle can be smoothed or corrected according to the history, and wherein the correction of the coordinates in the coordinate system occurs with consideration of the quality of the GPS reception in such a way that the scope of the correction and expense involved with the correction is made dependent on the number of received satellites.

10. The device according to claim 9, wherein an odometer and/or a compass or gyro is provided for correction of the coordinates.

11. The device according to claim 10, wherein the GPS receiver, odometer and/or gyro are arranged in a box as a functional unit.

12. The device according to claim 9, wherein a processor for process control and processing of the data and of data memory to provide the coordinate system and to enter the original and corrected data is provided.

13. The method according to claim 1, wherein correcting the coordinates in the coordinate system occurs with consideration of a predefinable minimum number of received satellites.

14. The method according to claim 9, wherein correcting the coordinates in the coordinate system occurs with consideration of a predefinable minimum number of received satellites.

* * * * *